(12) United States Patent
Kim et al.

(10) Patent No.: US 9,567,498 B2
(45) Date of Patent: Feb. 14, 2017

(54) ADHESIVE COMPOSITION FOR POLARIZING PLATE, ADHESIVE FILM FOR POLARIZING PLATE PREPARED USING THE SAME, POLARIZING PLATE COMPRISING THE SAME AND OPTICAL DISPLAY COMPRISING THE SAME

(71) Applicant: SAMSUNG SDI CO., LTD., Yongin-si, Gyeonggi-do (KR)

(72) Inventors: Won Kim, Uiwang-si (KR); Ha Yun Cho, Uiwang-si (KR); Yi Eun Kim, Uiwang-si (KR); Seung Hoon Lee, Uiwang-si (KR); In Cheon Han, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 14/946,701

(22) Filed: Nov. 19, 2015

(65) Prior Publication Data

US 2016/0152876 A1 Jun. 2, 2016

(30) Foreign Application Priority Data

Nov. 28, 2014 (KR) .................. 10-2014-0169207

(51) Int. Cl.
*G02B 1/00* (2006.01)
*C09J 133/08* (2006.01)
(Continued)

(52) U.S. Cl.
CPC ............... *C09J 133/08* (2013.01); *G02B 1/14* (2015.01); *G02B 5/305* (2013.01)

(58) Field of Classification Search
CPC ............. G02B 5/305; G02B 1/14; G02B 1/10; G02B 5/30; C09J 133/08; C09J 133/04; C09J 133/066; C08F 220/06; C08F 220/18; C08F 220/26; C08F 220/20; B32B 27/30; B32B 7/06; C08G 18/73; C08K 5/29; C08K 5/548; C08L 33/08
(Continued)

(56) References Cited

U.S. PATENT DOCUMENTS 8,314,186 B2 * 11/2012 Fung .................. C08G 18/73
525/118

FOREIGN PATENT DOCUMENTS

| JP | 2012-67275 A | 4/2012 |
| TW | 200728423 | 8/2007 |
| TW | 201439253 A | 10/2014 |

OTHER PUBLICATIONS

Taiwan Patent Office action dated May 16, 2016 issued in corresponding Application No. TW 104139043, 13 pages.

\* cited by examiner

*Primary Examiner* — Euncha Cherry
(74) *Attorney, Agent, or Firm* — Lewis Roca Rothgerber Christie LLP

(57) ABSTRACT

An adhesive composition for polarizing plates includes a (meth)acrylic copolymer, an isocyanate crosslinking agent, and a silane coupling agent. The molar ratio (A) of the number of moles of hydroxyl groups in the (meth)acrylic copolymer may be about 2.5 mol % to about 4 mol %, the molar ratio (B) of the number of moles of alkoxy silane groups in the silane coupling agent may be about 50 mol % to about 80 mol %, and the molar ratio (C) of the number of moles of isocyanate groups of the isocyanate crosslinking agent may be about 20 mol % to about 50 mol %, based on the total number of moles of alkoxy silane groups of the silane coupling agent and isocyanate groups of the isocyanate crosslinking agent. An adhesive film is formed from the
(Continued)

adhesive composition, a polarizing plate includes the adhesive film, and an optical display includes the polarizing plate.

13 Claims, 1 Drawing Sheet

(51) Int. Cl.
    *G02B 5/30*     (2006.01)
    *G02B 1/14*     (2015.01)

(58) Field of Classification Search
    USPC ............ 359/507; 525/118, 131, 329.5, 329.7
    See application file for complete search history.

ADHESIVE COMPOSITION FOR POLARIZING PLATE, ADHESIVE FILM FOR POLARIZING PLATE PREPARED USING THE SAME, POLARIZING PLATE COMPRISING THE SAME AND OPTICAL DISPLAY COMPRISING THE SAME

CROSS-REFERENCE TO RELATED APPLICATION

This application claims priority to and the benefit of Korean Patent Application No. 10-2014-0169207, filed on Nov. 28, 2014 in the Korean Intellectual Property Office, the entire content of which is incorporated herein by reference.

BACKGROUND

1. Technical Field

Embodiments of the present invention relate to an adhesive composition for polarizing plates, an adhesive film using the same, a polarizing plate including the same, and an optical display including the same.

2. Description of the Related Art

A liquid crystal display includes a polarizing plate stacked on each surface of a liquid crystal display panel. The polarizing plate includes a polarizer and a protective film formed on each surface of the polarizer. The polarizing plate may be stacked on the liquid crystal display panel via an adhesive layer formed on one surface of the protective film. A polarizing plate with a protective film formed on only one surface of the polarizer (referred to as a "TAC-less" polarizing plate when the protective film is a triacetyl cellulose (TAC) film) can lead to reduced material costs while still having a small thickness.

Such a TAC-less polarizing plate (in which a protective film is formed on only one surface of the polarizer) is likely to have a high warpage value and exhibit poor durability and reliability. In order to enhance durability and reliability, an adhesive layer may include a (meth)acrylic copolymer obtained by polymerization of a monomer mixture including a carboxylic acid group-containing monomer. However, such an adhesive layer can cause corrosion of the metal coating (due to the carboxylic acid group) when used in an indium tin oxide (ITO) metal-coated plane-to-line switching (PLS) or in-plane switching (IPS) liquid crystal panel.

Further, since the polarizer directly adjoins the adhesive layer in such a TAC-less polarizing plate, adhesion between the polarizer and the adhesive layer must be ensured in order to provide re-workability. However, the typical adhesive layer is limited in its ability to enhance adhesion between the polarizer and the adhesive layer. In addition, since the polarizer directly adjoins the adhesive layer in a TAG-less polarizing plate, the polarizer is likely to suffer from cracking under harsh conditions (such as high temperature and/or high humidity environments). In order to overcome these problems, the adhesive layer must have sufficient adhesion to the polarizer. As described above, however, the typical adhesive layer has limited ability to enhance adhesion between the polarizer and the adhesive layer.

SUMMARY

In embodiments of the present invention, an adhesive composition for polarizing plates can form an adhesive film having improved adhesion to a polarizer.

In accordance with embodiments of the present invention, an adhesive composition for polarizing plates includes: a (meth)acrylic copolymer, an isocyanate crosslinking agent, and a silane coupling agent. The molar ratio (A) of the molar amount (i.e., the number of moles) of hydroxyl groups in the (meth)acrylic copolymer may be about 2.5 mol % to about 4 mol %, based on the total molar amount (i.e., the total number of moles) of the sum of alkoxy silane groups in the silane coupling agent and isocyanate groups in the isocyanate crosslinking agent. The molar ratio (B) of the molar amount (i.e., the number of moles) of alkoxy silane groups in the silane coupling agent may be about 50 mol % to about 80 mol %, based on the total molar amount (i.e., the total number of moles) of the sum of alkoxy silane groups in the silane coupling agent and isocyanate groups in the isocyanate crosslinking agent. The molar ratio (C) of the molar amount (i.e., the number of moles) of isocyanate groups in the isocyanate crosslinking agent may be about 20 mol % to about 50 mol %, based on the total molar amount (i.e., the total number of moles) of the sum of alkoxy silane groups in the silane coupling agent and isocyanate groups in the isocyanate crosslinking agent.

In accordance with embodiments of the present invention, an adhesive film for polarizing plates may have an adhesive strength to the polarizer of about 1,000 gf/inch or greater.

In accordance with embodiments of the present invention, a polarizing plate may include the adhesive film for polarizing plates described herein.

In accordance with embodiments of the present invention, an optical display may include the polarizing plate described herein.

Embodiments of the present invention provide an adhesive composition for polarizing plates, and the adhesive composition may be used in a polarizing plate that includes a polarizer and a protective film formed on only one surface of the polarizer. The adhesive composition according to embodiments of the present invention can form an adhesive film having good moisture and heat resistance reliability, and a low warpage value. In addition, embodiments of the present invention provide an adhesive composition for polarizing plates which can form an adhesive film that does not cause (or causes a reduced amount of) corrosion of the metal coating when used in a liquid crystal display panel. Further, embodiments of the present invention provide an adhesive composition for polarizing plates which can form an adhesive film having improved adhesion to the polarizer.

DETAILED DESCRIPTION

Figure 1:
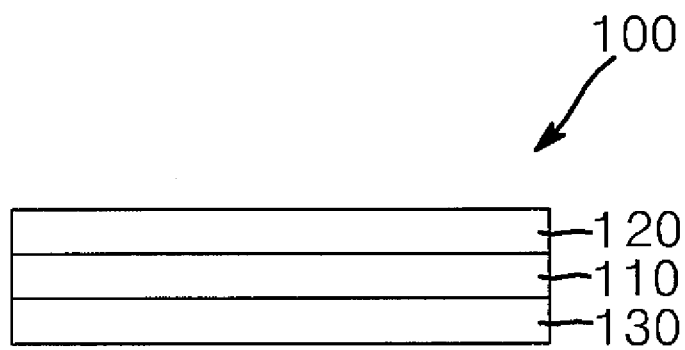
FIG. 1 is a schematic cross-sectional view of a polarizing plate according to embodiments of the present invention.

Embodiments of the present invention are described with reference to the accompanying drawings. It is understood, however, that the present invention may be embodied in different ways and is not limited to the following embodiments. In the drawings, portions irrelevant to the description are omitted for clarity. Like components are denoted by like reference numerals throughout the specification.

As used herein, the term "(meth)acrylic" may refer to acrylic and/or methacrylic, and the term "(meth)acrylate" may refer to acrylates and/or methacrylates.

As used herein, directional terms such as "upper" and "lower" are defined with reference to the accompanying drawings. Thus, it is understood that the term "upper side" can be used interchangeably with the term "lower side".

As used herein, the "molar ratio (A) of the molar amount of hydroxyl groups in the (meth)acrylic copolymer" is calculated using Equation 1.

$$\text{Molar Ratio } A = (a2/a1) \times 100 \quad (1)$$

In Equation 1, a1 denotes the total number of moles of the monomers contained in the monomer mixture used to form the (meth)acrylic copolymer (unit: mol), and a2 denotes the number of moles of hydroxyl group-containing (meth) acrylic monomers (unit: mol) in the monomer mixture.

As used herein, the "molar ratio (B) of the molar amount of alkoxy silane groups in the silane coupling agent" is calculated using Equation 2.

$$\text{Molar Ratio } B = \{b/(b+c)\} \times 100 \quad (2)$$

In Equation 2, b denotes (the number of moles of the silane coupling agent in the adhesive composition)×(the number of moles of alkoxy silane groups contained in one molecule of the silane coupling agent), and c denotes (the number of moles of the isocyanate crosslinking agent in the adhesive composition)×(the number of moles of isocyanate groups contained in one molecule of the isocyanate crosslinking agent).

As used herein, the "molar ratio (C) of the molar amount of isocyanate groups in the isocyanate crosslinking agent" is calculated using Equation 3.

$$\text{Molar Ratio } C = \{c/(b+c)\} \times 100 \quad (3)$$

In Equation 3, b denotes (the number of moles of silane coupling agent in the adhesive composition)×(the number of moles of alkoxy silane groups contained in one molecule of the silane coupling agent), and c denotes (the number of moles of the isocyanate crosslinking agent in the adhesive composition)×(the number of moles of isocyanate groups contained in one molecule of the isocyanate crosslinking agent).

Hereinafter, an adhesive composition for polarizing plates according to embodiments of the present invention is described.

The adhesive composition for polarizing plates according to embodiments of the present invention may be used to bond a polarizing plate (including a polarizer and an optical film formed on one surface of the polarizer) to an optical display panel. The adhesive composition for polarizing plates according to embodiments includes a (meth)acrylic copolymer, an isocyanate crosslinking agent, and a silane coupling agent. In the adhesive composition, the molar ratio (A) of the molar amount (i.e., the number of moles of) hydroxyl groups in the (meth)acrylic copolymer may be about 2.5 mol % to about 4 mol %, the molar ratio (B) of the molar amount (i.e., the number of moles) of alkoxy silane groups in the silane coupling agent may be about 50 mol % to about 80 mol %, and the molar ratio (C) of the molar amount (i.e., the number of moles) of isocyanate groups (NCO) in the isocyanate crosslinking agent may be about 20 mol % to about 50 mol %.

The molar ratio (A) of the molar amount (i.e., the number of moles) of hydroxyl groups in the (meth)acrylic copolymer may be about 2.5 mol % to about 4 mol %. Within this range, hydroxyl groups in the (meth)acrylic copolymer which have not reacted with the silane coupling agent and the crosslinking agent can form hydrogen bonds with the hydroxyl groups of the polarizer (e.g., a polyvinyl alcohol-based polarizer), and the crosslinking agent can connect the hydroxyl groups of the adhesive layer to the hydroxyl groups of the polarizer. This increases adhesion between the polarizer and the adhesive film while also enhancing the durability and reliability of the polarizing plate.

The molar ratio (B) of the molar amount (i.e., the number of moles) of alkoxy silane groups in the silane coupling agent may be about 50 mol % to about 80 mol %, and the molar ratio (C) of the molar amount (i.e., the number of moles) of isocyanate groups in the isocyanate crosslinking agent may be about 20 mol % to about 50 mol %. The hydroxyl groups contained in the (meth)acrylic copolymer and a polyvinyl alcohol-based polarizer react with the alkoxy silane groups of the silane coupling agent and the isocyanate groups of the crosslinking agent. Within the above ranges for the molar ratios B and C, the hydroxyl groups in the polyvinyl alcohol-based polarizer can react with the alkoxy silane groups of the silane coupling agent, thereby increasing adhesion between the polarizer and the adhesive film while also enhancing the durability and reliability of the polarizing plate.

When molar ratio B≥molar ratio C, warpage of the polarizing plate can be suppressed or reduced. For example, when molar ratio B>molar ratio C, the number of moles of isocyanate groups is small, allowing the polarizing plate to exhibit further enhanced warpage resistance. In some embodiments, the difference between molar ratio B and molar ratio C (i.e., molar ratio B−molar ratio C) may be about 5 mol % to about 56 mol %, for example, about 20 mol % to about 56 mol %.

In some embodiments, the (meth)acrylic copolymer can be cured in the presence of the isocyanate crosslinking agent, thereby enhancing the mechanical strength of the adhesive layer. The (meth)acrylic copolymer may be a copolymer of a monomer mixture including: a hydroxyl group-containing (meth)acrylic monomer; and at least one of an alkyl group-containing (meth)acrylic monomer, a hetero ring-containing (meth)acrylic monomer, an aromatic group-containing (meth)acrylic monomer, and/or an alicyclic group-containing (meth)acrylic monomer.

The hydroxyl group-containing (meth)acrylic monomer may be a $C_2$ to $C_{20}$ alkyl group, $C_5$ to $C_{20}$ cycloalkyl group, or $C_6$ to $C_{20}$ aryl group-containing (meth)acrylic acid ester, and the hydroxyl-group containing (meth)acrylic monomer has a hydroxyl group at a terminal thereof or in a backbone thereof. For example, the hydroxyl group-containing (meth) acrylic monomer may include at least one of 2-hydroxyethyl (meth)acrylate, 2-hydroxypropyl(meth)acrylate, 2-hydroxybutyl(meth)acrylate, 4-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxy-3-phenyloxypropyl(meth)acrylate, 4-hydroxycyclopentyl(meth) acrylate, 4-hydroxycyclohexyl(meth)acrylate, and/or cyclohexanedimethanol mono(meth)acrylate, but the hydroxyl group-containing (meth)acrylic monomer is not limited thereto. A single hydroxyl group-containing (meth)acrylic monomer may be used, or a combination thereof may be used.

The hydroxyl group-containing (meth)acrylic monomer may be present in the monomer mixture in an amount of about 2.5 mol % to about 4.0 mol %. Within this range, the adhesive composition can form an adhesive film capable of exhibiting good adhesion to a polarizer, re-peelability, and durability, while also preventing (or suppressing or reducing) warpage of the polarizing plate and cracking of the polarizer.

The alkyl group-containing (meth)acrylic monomer can improve the reliability of the adhesive layer. The alkyl group-containing (meth)acrylic monomer may include a (meth)acrylic acid ester having a linear or branched $C_1$ to $C_{20}$ alkyl group. For example, the alkyl group-containing (meth)acrylic monomer may include at least one of methyl (meth)acrylate, ethyl(meth)acrylate, propyl(meth)acrylate, n-butyl(meth)acrylate, t-butyl(meth)acrylate, iso-butyl (meth)acrylate, pentyl(meth)acrylate, hexyl(meth)acrylate, 2-ethylhexyl(meth)acrylate, heptyl(meth)acrylate, octyl (meth)acrylate, iso-octyl(meth)acrylate, nonyl(meth)acrylate, decyl(meth)acrylate, and/or dodecyl(meth)acrylate, but the alkyl group-containing (meth)acrylic monomer is not limited thereto. A single alkyl group-containing (meth) acrylic monomer may be used, or a combination thereof may be used.

The alkyl group-containing (meth)acrylic monomer may be present in the monomer mixture in an amount of about 76 mol % to about 97.5 mol %. Within this range of the alkyl group-containing (meth)acrylic monomer, the adhesive composition can form an adhesive film capable of exhibiting good adhesion to the polarizer, re-peelability, and durability, while also preventing (or suppressing or reducing) warpage of the polarizing plate and cracking of the polarizer. In some embodiments, the alkyl group-containing (meth)acrylic monomer may be present in the monomer mixture in an amount of about 76 mol % to about 97.4 mol % or about 96 mol % to about 97.5 mol %.

The hetero ring-containing (meth)acrylic monomer may be a $C_2$ to $C_{10}$ aliphatic or alicyclic saturated or unsaturated hetero ring-containing monomer having a ring heteroatom (for example, at least one of nitrogen, oxygen, and sulfur), or a $C_4$ to $C_{20}$ aromatic hetero ring-containing monomer having a ring heteroatom (for example, at least one of nitrogen, oxygen, and sulfur). For example, the hetero ring-containing (meth)acrylic monomer may include (meth) acryloyl morpholine.

The hetero ring-containing (meth)acrylic monomer may be present in the monomer mixture in an amount of about 0.1 mol % to about 20 mol %. Within this range, the adhesive composition can form an adhesive film capable of exhibiting good adhesion to the polarizer, re-peelability, and durability, while also preventing (or suppressing or reducing) warpage of the polarizing plate and cracking of the polarizer.

The aromatic group-containing (meth)acrylic monomer is an unsubstituted $C_6$ to $C_{20}$ aromatic group-containing (meth) acrylic monomer and may be represented by, for example, Formula 1.

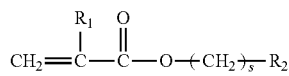

In Formula 1, $R_1$ is hydrogen or a methyl group, s is an integer of 0 to 10, and $R_2$ is a phenoxy group, a phenyl group, a methylphenyl group, a methylethylphenyl group, a methoxyphenyl group, a propylphenyl group, a cyclohexylphenyl group, a chlorophenyl group, a bromophenyl group, a phenylphenyl group, a benzyl group, or a benzylphenyl group.

Nonlimiting examples of the aromatic group-containing (meth)acrylic monomer include 2-phenoxyethyl(meth)acrylate, phenyl(meth)acrylate, phenoxy(meth)acrylate, 2-ethylphenoxy(meth)acrylate, benzyl(meth)acrylate, 2-phenylethyl(meth)acrylate, 3-phenylpropyl(meth)acrylate, 4-phenylbutyl(meth)acrylate, 2-2-methylphenylethyl(meth) acrylate, 2-3-methylphenylethyl(meth)acrylate, 2-4-methylphenylethyl(meth)acrylate, 2-(4-propylphenyl)ethyl(meth) acrylate, 2-(4-(1-methylethyl)phenyl ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth) acrylate, 2-(3-chlorophenyl)ethyl(meth)acrylate, 2-(4-chlorophenyl)ethyl(meth)acrylate, 2-(4-bromophenyl)ethyl (meth)acrylate, 2-(3-phenylphenyl)ethyl(meth)acrylate, benzyl(meth)acrylate, and 2-(4-benzyl phenyl)ethyl(meth) acrylate. A single aromatic group-containing (meth)acrylic monomer may be used, or a combination thereof may be used.

The aromatic group-containing (meth)acrylic monomer may be present in the monomer mixture in an amount of about 0.1 mol % to about 20 mol %. Within this range, the adhesive composition can for an adhesive film capable of exhibiting good adhesion to the polarizer, re-peelability, and durability, while also preventing (or suppressing or reducing) warpage of the polarizing plate and cracking of the polarizer.

The alicyclic group-containing (meth)acrylic monomer may include a $C_4$ to $C_{20}$ alicyclic group-containing (meth) acrylic monomer. For example, the alicyclic group-containing (meth)acrylic monomer may include at least one of isobornyl(meth)acrylate and/or cyclopentyl(meth)acrylate, but the alicyclic group-containing (meth)acrylic monomer is not limited thereto.

The alicyclic group-containing (meth)acrylic monomer may be present in the monomer mixture in an amount of about 0.1 mol % to about 20 mol %. Within this range, the adhesive composition can form an adhesive film capable of exhibiting good adhesion to the polarizer, re-peelability, and durability, while also preventing (or suppressing or reducing) warpage of the polarizing plate and cracking of the polarizer.

In some embodiments, the monomer mixture for forming the (meth)acrylic copolymer may include about 96.0 mol % to about 97.5 mol % of an unsubstituted $C_1$ to $C_{20}$ alkyl group-containing (meth)acrylic acid ester, and about 2.5 mol % to about 4.0 mol % of a $C_2$ to $C_{20}$ alkyl group-containing (meth)acrylic acid ester having a hydroxyl group.

In some embodiments, the monomer mixture for forming the (meth)acrylic copolymer may include: about 76.0 mol % to about 97.4 mol % of an unsubstituted $C_1$ to $C_{20}$ alkyl group-containing (meth)acrylic acid ester; about 2.5 mol % to about 4.0 mol % of a $C_2$ to $C_{20}$ alkyl group-containing (meth)acrylic acid ester having a hydroxyl group; and about 0.1 mol % to about 20.0 mol % of at least one of the hetero ring-containing (meth)acrylic monomer, the alicyclic group-containing (meth)acrylic monomer, and/or the aromatic group-containing (meth)acrylic monomer.

The (meth)acrylic copolymer may have a weight average molecular weight of greater than 0 g/mol and less than or equal to about 2,000,000 g/mol, for example, about 800,000 g/mol to about 1,000,000 g/mol. Within these ranges, the adhesive composition can provide good reliability, while also suppressing (or reducing) light leakage. The weight average molecular weight may be measured by gel permeation chromatography.

The (meth)acrylic copolymer may have a polydispersity index (PDI) of about 1.5 to about 15, for example, about 2 to about 7. Within these ranges, the adhesive composition can provide good reliability.

The (meth)acrylic copolymer may have a glass transition temperature of about −52° C. to about −27° C. Within this range, the adhesive composition can provide stress relaxation to the polarizing plate, and exhibit improved adhesion to glass, thereby minimizing light leakage while also providing high shrinkage resistance.

The (meth)acrylic copolymer may have an acid value of about 0.5 mg KOH/g or lower, for example about 0.3 mgKOH/g or lower, or 0 mgKOH/g. Within these ranges, the adhesive composition does not cause (or causes a reduced amount of) corrosion of the indium tin oxide (ITO) metal coating when used in a PLS or IPS liquid crystal display.

The (meth)acrylic copolymer may be prepared by solution polymerization, photopolymerization, bulk polymerization, or emulsion polymerization, but is not limited thereto. For example, the (meth)acrylic copolymer may be prepared by solution polymerization at a polymerization temperature of about 50° C. to about 140° C. for a polymerization time of about 5 to 24 hours. A polymerization initiator may be used, and may include an azo-based initiator such as azobisisobutyronitrile and/or azobis(cyclohexanecarbonitrile); and/or any suitable initiator including peroxides such as benzoyl peroxide and acetyl peroxide, and the like. The initiator may be present in an amount of about 0.01 parts by weight to about 10 parts by weight based on 100 parts by weight of the alkyl group-containing (meth)acrylic monomer. Within this range, the copolymer can be sufficiently polymerized. The solvent used during polymerization may include at least one of ethyl acetate and/or methylethylketone, but is not limited thereto.

The isocyanate crosslinking agent serves to cure the (meth)acrylic copolymer, and may include a bi- or higher functional polyisocyanate crosslinking agent, a mono- or higher functional modified polyisocyanate crosslinking agent, or a mixture thereof. In some embodiments, a modified polyisocyanate crosslinking agent may be more effective in suppressing (or reducing) cracking of the polarizer and improving the re-peelability and durability of the polarizer.

For example, the bi- or higher functional polyisocyanate crosslinking agent may include hexamethylene diisocyanate (HDI); toluene diisocyanate (TDI) such as 2,4-toluene diisocyanate and 2,6-toluene diisocyanate; methylenediphenyl diisocyanate (MDI); xylene diisocyanate (XDI) such as 1,3-xylene diisocyanate and 1,4-xylene diisocyanate; hydrogenated toluenediisocyanate; isophorone diisocyanate; 1,3-bisisocyanatomethylcyclohexane; tetramethyixylene diisocyanate; 1,5-naphthalene diisocyanate; hexamethylene diisocyanate; 2,2,4-trimethylhexamethylene diisocyanate; 2,4,4-trimethylhexamethylene diisocyanate; trimethylolpropane-modified toluene diisocyanate; adducts of trilene diisocyanate with trimethylolpropane, adducts of xylene diisocyanate with trimethylolpropane; triphenylmethanetriisocyanate; and/or methylenebistriisocyanate, but the bi- or higher functional polyisocyanate crosslinking agent is not limited thereto. Also, a single bi- or higher functional polyisocyanate crosslinking agent may be used, or a combination thereof may be used.

The modified polyisocyanate crosslinking agent may include a crosslinking agent obtained by end capping some of the isocyanate groups in the bi- or higher functional polyisocyanate crosslinking agent. For example, the modified polyisocyanate crosslinking agent may include a crosslinking agent obtained by end capping one isocyanate group of a bi-functional polyisocyanate crosslinking agent, a crosslinking agent obtained by end capping one or two isocyanate groups of a tri-functional polyisocyanate crosslinking agent, or a crosslinking agent obtained by end capping one to three isocyanate groups of a tetra-functional polyisocyanate crosslinking agent. The modified polyisocyanate crosslinking agent may be a commercially available product or may be prepared by reacting the bi- or higher functional polyisocyanate crosslinking agent with an alcohol or the like to perform the end capping of some of the isocyanate groups.

The isocyanate crosslinking agent may be present in an amount of about 0.1 parts by weight to about 10 parts by weight, for example about 0.1 parts by weight to about 5 parts by weight, or about 0.1 parts by weight to about 2 parts by weight, based on 100 parts by weight of the (meth)acrylic copolymer. Within these ranges, the adhesive composition can form an adhesive film which exhibits good durability and fewer changes in components and properties over time.

The silane coupling agent is included in the adhesive composition to improve moisture resistance and moisture-and-heat resistance reliability of the adhesive layer. The silane coupling agent may be any suitable alkoxy silane group-containing silane coupling agent. For example, the silane coupling agent may include at least one selected from epoxy structure-containing silicon compounds such as 3-glycidoxypropyltrimethoxysilane, 3-glycidoxypropylmethyldimethoxysilane, and 2-(3,4-epoxycyclohexyl)ethyltrimethoxysilane; polymerizable unsaturated group (for example, (meth)acrylate group)-containing silicon compounds such as vinyltrimethoxysilane, vinyltriethoxysilane, and (meth)acryloxypropyltrimethoxysilane; amino group-containing silicon compounds such as 3-aminopropyltrimethoxysilane, N-(2-aminoethyl)-3-aminopropyltrimethoxysilane, and N-(2-aminoethyl)-3-aminopropylmethyldimethoxysilane; mercapto group-containing silicon compounds such as 3-mercaptopropyltrimethoxysilane; and/or 3-chloropropyltrimethoxysilane, but the silane coupling agent is not limited thereto. In some embodiments, a mercapto group-containing silicon compound may be used as the silane coupling agent in order to further improve the durability of the adhesive film.

The silane coupling agent may be present in an amount of about 0.1 parts by weight to about 10 parts by weight, for example about 0.1 parts by weight to about 5 parts by weight, or about 0.1 parts by weight to about 1 part by weight, based on 100 parts by weight of the (meth)acrylic copolymer. Within these ranges, the adhesive composition can form an adhesive film which exhibits good durability and fewer changes in components and properties over time.

The adhesive composition for polarizing plates may further include a solvent to enhance coatability and application properties. The solvent may include methylethylketone, but is not limited thereto. The adhesive composition for polarizing plates may further include any suitable additives, such as UV absorbers and/or antioxidants.

The adhesive composition for polarizing plates may have a viscosity at 25° C. of about 1,000 cPs to about 6,000 cPs. Within this range, the thickness of the adhesive film can be easily adjusted, stains can be prevented (or reduced), and the adhesive composition can be uniformly coated.

Next, an adhesive film for polarizing plates according to embodiments of the present invention is described.

The adhesive film for polarizing plates according to embodiments of the invention may have an adhesive strength to a polyvinyl alcohol-based polarizer of about 1,000 gf/inch or greater. Within this range, it is possible to prevent cracking of the polarizer and to fabricate a polarizing plate having good re-peelability and durability. For example, the adhesive film for polarizing plates may have an adhesive strength to a polyvinyl alcohol-based polarizer of about 1,000 gf/inch to about 1500 gf/inch. In some embodiments, the adhesive film for polarizing plates may have an adhesive strength to a polyvinyl alcohol-based polarizer of about 1,000 gf/inch to about 1200 gf/inch.

The polyvinyl alcohol-based polarizer for measuring adhesive strength may include a polarizer prepared using a polyvinyl alcohol resin. For example, the polyvinyl alcohol-based polarizer may be a polarizer (thickness: 22 µm) prepared by swelling a polyvinyl alcohol film (VF-PS #6000, polymerization degree: 2,400, saponification degree: 99%, thickness: 60 µm, Kuraray Co., Ltd., Japan) in an aqueous solution at 30° C., followed by stretching to an elongation of 3.1 at 30° C., iodine adsorption in a 0.02 wt % aqueous iodine solution, and stretching to an elongation of 2 in a boric acid solution at 57° C. to a final elongation of 6.2. The adhesive film for polarizing plates for measuring adhesion may be a 5 µm to 100 µm thick film obtained by coating the adhesive film for polarizing plates, followed by leaving the film at 20° C. to 35° C. for 1 hour to 1 week.

The adhesive film for polarizing plates may be prepared by drying and/or aging the adhesive composition for polarizing plates according to embodiments of the invention. In some embodiments, aging may include thermal curing or leaving the film at about 20° C. to about 35° C. for about 1 hour to 1 week, but the aging process is not limited thereto. For example, the adhesive film may be prepared by coating the adhesive composition onto a release film (for example, a polyethylene terephthalate film), followed by drying and curing at about 20° C. to about 35° C.

The adhesive film for polarizing plates may have a thickness of about 5 µm to about 100 µm, for example about 10 µm to about 50 µm. Within these ranges, the adhesive film can be applied to a polarizing plate.

The adhesive film for polarizing plates may have an acid value of about 0.5 mgKOH/g or lower, for example about 0.3 mgKOH/g or lower. Within these ranges, it is possible to provide a polarizing plate having good reliability.

A polarizing plate according to embodiments of the present invention may include an adhesive layer formed of the adhesive film for polarizing plates according to embodiments of the invention, or formed from an adhesive composition for polarizing plates according to embodiments of the invention. For example, the polarizing plate includes a polarizer, an optical film formed on one surface of the polarizer, and an adhesive layer formed on the other surface of the polarizer. The adhesive layer may be formed from the adhesive composition for polarizing plates according to embodiments of the invention. The optical film may include at least one of a zero retardation protective film, and/or a retardation film.

Next, a polarizing plate according to embodiments of the present invention is described with reference to FIG. 1. Referring to FIG. 1, a polarizing plate 100 according to embodiments of the present invention may include a polarizer 110; an optical film 120 formed on an upper side of the polarizer 110; and an adhesive layer 130 formed on a lower side of the polarizer 110. The adhesive layer 130 may be formed of the adhesive film or adhesive composition according to embodiments of the present invention.

For the polarizer, any suitable polyvinyl alcohol film may be used, regardless of its manufacturing process. For example, the polyvinyl alcohol film may include a modified polyvinyl alcohol film, such as a partially formalized polyvinyl alcohol film, an acetoacetyl group modified polyvinyl alcohol film, or the like. The polarizer may be prepared by dyeing a polyvinyl alcohol film with iodine or a dichroic dye, followed by stretching in a particular direction. For example, the polarizer may be prepared by swelling, dyeing, and stretching a polyvinyl alcohol film. Methods of performing each of these processes are well known to those skilled in the art. The polarizer may have a thickness of about 10 µm to about 50 µm, but is not limited thereto.

The optical film may be a cyclic polyolefin film, such as an amorphous cycloolefin polymer (COP), or the like, a poly(meth)acrylate film, a polycarbonate film, a polyester film such as polyethylene terephthalate (PET), a polyethersulfone film, a polysulfone film, a polyamide film, a polyimide film, a polyolefin film, a polyacrylate film, a polyvinyl alcohol film, a polyvinyl chloride film, a polyvinylidene chloride film, or a mixture thereof.

The optical film may have a thickness of about 10 µm to about 200 µm, for example, about 30 µm to about 120 µm, but the optical film is not limited thereto. Within these ranges, the optical film can be used in an optical display.

The adhesive film may be formed by coating the adhesive composition according to embodiments of the invention onto one surface of the polarizer, followed by drying and/or curing. The adhesive film may have a thickness of about 5 µm to about 100 µm.

An optical display according to embodiments of the present invention may include the polarizing plate according to embodiments of the invention and may be a liquid crystal display or an organic light-emitting diode display.

Next, a liquid crystal display according to embodiments of the present invention is described with reference to FIG. 2.

Figure 2:
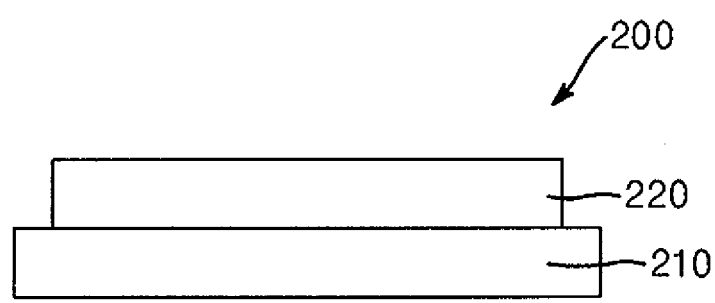
FIG. 2 is a schematic cross-sectional view of a liquid crystal display according to embodiments of the present invention.

Referring to FIG. 2, a liquid crystal display 200 according to embodiments of the present invention includes a liquid crystal display panel 210 and a polarizing plate 220 formed on an upper side of the liquid crystal panel 110. The polarizing plate 220 may be the polarizing plate according to embodiments of the present invention.

Hereinafter, embodiments of the present invention are described with reference to some examples. However, it is understood that these examples are provided for illustration only and are not to be construed in any way as limiting the present invention.

PREPARATIVE EXAMPLE 1

Preparation of (meth)acrylic Copolymer 50 g of ethyl acetate (EAc), 10 g of methylethylketone (MEK), 100 g of butyl acrylate (n-BA), and 2.5 g of 2-hydroxyethyl methacrylate (2-HEMA) were placed in a 1L 4-neck flask, followed by heating the flask to 70° C. and then maintaining the flask at 70° C. 0.06 g of azobisisobutyronitrile as a polarization initiator was dissolved in 20 g of ethyl acetate and introduced into the flask. The reaction was performed at 65° C. for 3 hours, followed by the introduction of 170 g of methylethylketone into the flask and then cooling the flask to 40° C., thereby preparing a methacrylic copolymer having a viscosity of 4,400 cPs at 25° C. and an acid value of 0 mgKOH/g.

PREPARATIVE EXAMPLES 2 TO 8

Preparation of (meth)acrylic Copolymers (Meth)acrylic copolymers were prepared as in Preparative Example 1 except that the amounts of the monomers (unit: g) were modified as in Table 1.

TABLE 1

|  |  | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 |
|---|---|---|---|---|---|---|---|---|---|
| Amount of monomer (g) | n-BA | 100 | 100 | 100 | 100 | 100 | 100 | 100 | 100 |
|  | 2-HEMA | 2.5 | 3.0 | 4.1 | 3.4 | 3.4 | 3.4 | 2.0 | 4.6 |
|  | IBOA | — | — | — | 10 | — | — | — | — |
|  | ACMO | — | — | — | — | 10 | — | — | — |
|  | 2-PHEA | — | — | — | — | — | 10 | — | — |
| Ratio of molar amount of hydroxyl groups in acrylic copolymer (mol %) |  | 2.5 | 3.0 | 4.0 | 3.0 | 3.0 | 3.0 | 2.0 | 4.5 | n-BA: n-butyl acrylate,
2-HEMA: 2-hydroxyethyl methacrylate,
IBOA: isobornyl acrylate,
ACMO: acryloylmorpholine,
2-PHEA: 2-phenoxy ethyl acrylate

EXAMPLE 1

In terms of solids content, 100 g of the acrylic copolymer prepared in Preparative Example 1, 0.65 g of a modified polyisocyanate crosslinking agent (BXX-6460, Toyo Ink Co., Ltd., molecular weight: 356 g/mol, number of isocyanate groups per molecule of modified polyisocyanate crosslinking agent: 2), and 0.84 g of a silane coupling agent (3-mercaptopropyltrimethoxysilane, KBM-403, Shin-Etsu Chemical Co., Ltd., molecular weight: 196 g/mol, number of alkoxy groups per molecule of silane coupling agent: 3) were mixed with 18 g of methylethylketone, followed by stirring at 25° C. for 30 minutes, thereby preparing an adhesive composition for polarizing plates.

EXAMPLES 2 TO 8

Adhesive compositions for polarizing plates were prepared as in Example 1, except that the types of (meth)acrylic copolymers and the types and amounts of crosslinking agents and silane coupling agents were as listed in Table 2.

COMPARATIVE EXAMPLES 1 TO 4

Adhesive compositions for polarizing plates were prepared as in Example 1, except that the types of (meth)acrylic copolymers and the types and amounts of crosslinking agents and silane coupling agents were as listed in Table 2.

The adhesive compositions for polarizing plates prepared according to the Examples and Comparative Examples, and adhesive films prepared by coating and curing the adhesive compositions were evaluated as to properties (1) to (3) discussed below. The results are shown in Table 2 and Table 3.

TABLE 2

|  | Example | | | | | | |
|---|---|---|---|---|---|---|---|
|  | 1 | 2 | 3 | 4 | 5 | 6 | 7 |
| Kind of acrylic copolymer | Prep. Ex. 1 | Prep. Ex. 2 | Prep. Ex. 2 | Prep. Ex. 3 | Prep. Ex. 4 | Prep. Ex. 5 | Prep. Ex. 6 |
| Acrylic copolymer (g) | 100 | 100 | 100 | 100 | 100 | 100 | 100 |
| Ratio of molar amount of hydroxyl groups in acrylic copolymer (mol %) | 2.5 | 3.0 | 3.0 | 4.0 | 3.0 | 3.0 | 3.0 |
| Silane coupling agent (g) | 0.84 | 0.84 | 0.36 | 0.84 | 0.84 | 0.84 | 0.84 |
| Molar amount of silane coupling agent (mol) | 0.0043 | 0.0043 | 0.0018 | 0.0043 | 0.0043 | 0.0043 | 0.0043 |
| Isocyanate crosslinking agent (g) | 0.65 | 0.65 | 0.65 | 0.65 | 0.65 | 0.65 | 0.65 |
| Molar amount of isocyanate crosslinking agent (mol) | 0.0018 | 0.0018 | 0.0018 | 0.0018 | 0.0018 | 0.0018 | 0.0018 |
| Molar ratio of molar amount of alkoxy silane groups of silane coupling agent (B) (mol %) | 78 | 78 | 60 | 78 | 78 | 78 | 78 |
| Molar ratio of molar amount of isocyanate groups of isocyanate crosslinking agent (C) (mol %) | 22 | 22 | 40 | 22 | 22 | 22 | 22 |
| Heat resistance reliability | ○ | ○ | ○ | ○ | ○ | ○ | ○ |
| Moisture resistance reliability | ○ | ○ | ○ | ○ | ○ | ○ | ○ |
| Warpage (mm) | 1.1 | 2.7 | 3.0 | 3.2 | 2.5 | 2.8 | 3.0 |
| Adhesion to polarizer (gf/inch) | 1100 | 1100 | 1000 | 1050 | 1200 | 1100 | 1100 |

TABLE 3

| | Comparative Example | | | |
|---|---|---|---|---|
| | 1 | 2 | 3 | 4 |
| Kind of acrylic copolymer | Preparative Example 7 | Preparative Example 2 | Preparative Example 3 | Preparative Example 8 |
| Acrylic copolymer (g) | 100 | 100 | 100 | 100 |
| Molar ratio of molar amount of hydroxyl groups of acrylic copolymer (mol %) | 2.0 | 3.0 | 4.0 | 4.5 |
| Silane coupling agent (g) | 0.84 | 1.43 | 0.15 | 0.84 |
| Molar amount of silane coupling agent (mol) | 0.0043 | 0.0073 | 0.0008 | 0.0043 |
| Isocyanate crosslinking agent (g) | 0.65 | 0.65 | 0.65 | 0.65 |
| Molar amount of isocyanate crosslinking agent (mol) | 0.0018 | 0.0018 | 0.0018 | 0.0018 |
| Molar ratio of molar amount of alkoxy silane groups of silane coupling agent (B) (mol %) | 78 | 86 | 40 | 78 |
| Molar ratio of molar amount of isocyanate groups of isocyanate crosslinking agent (C) (mol %) | 22 | 14 | 60 | 22 |
| Heat resistance reliability | Δ | x | x | x |
| Moisture resistance reliability | x | Δ | x | x |
| Warpage (mm) | 1.2 | 1.5 | 4.3 | 4.5 |
| Adhesion to polarizer (gf/inch) | 700 | 900 | 400 | 400 |

As shown in Table 2, the polarizing plates according to embodiments of the present invention exhibited high heat resistance and moisture resistance reliability, and had low warpage values. In addition, the polarizing plates according to embodiments of the present invention had high adhesive strength to the polarizer, thereby exhibiting good re-workability.

On the contrary, the polarizing plates of Comparative Examples 1 to 4 (in which the ratio of the molar amount of hydroxyl groups to the total number of functional groups of the acrylic copolymer, and the values of (B) and (C) were outside the ranges according to embodiments of the present invention) exhibited poor heat resistance and moisture resistance reliability, or had high warpage values.

(1) Heat resistance and moisture resistance reliability: The adhesive composition was coated onto a release film to a thickness of 20 μm, followed by drying.

The dried composition was then attached to a polarizer, thereby preparing a polarizing plate. The polarizing plate (100 mm×175 mm, width×length) was attached to a glass substrate, followed by compression at a pressure of 4 kg/cm² to 5 kg/cm², thereby preparing a specimen. Moist heat resistance of the specimen was evaluated by leaving the specimen at 60° C. and 90% RH for 500 hours, followed by observing whether the specimen suffered from bubbling or peeling. Evaluation of heat resistance was conducted after leaving the specimen at 85° C. for 500 hours. In both evaluations, the specimen was left at room temperature for 1 hour or longer and then observed with the naked eye or with a microscope. Evaluation criteria were as follows:
○: Neither bubbling nor peeling
Δ: Slight bubbling or peeling
x: Bubbling or peeling (2) Warpage: A polyvinyl alcohol film (VF-PS #6000, polymerization degree: 2,400, saponification degree: 99%, thickness: 60 μm, Kuraray Co., Ltd., Japan) was subjected to swelling in an aqueous solution at 30° C., stretching to an elongation of 3.1 at 30° C., iodine adsorption in a 0.02 wt % aqueous iodine solution, and stretching to an elongation of 2 in a boric acid solution at 57° C. to yield a final elongation of 6.2, thereby preparing a polarizer (thickness: 22 μm). An adhesive film having a size of 210 mm×25 mm×0.5 cm (length×width×thickness) was attached to a 205 mm×20 mm (length×width) specimen obtained by cutting the prepared polarizer. Then, the adhesive film was attached to 0.5 T glass having a size of 210 mm×25 mm×0.5 cm (length×width× thickness). Warpage was measured after leaving the specimen at 85° C. for 24 hours. Warpage was defined as the maximum height of a bent portion of the specimen with respect to the floor.

(3) Adhesive strength to polarizer: A polarizer was prepared as in the (2) warpage evaluation. The prepared polarizer was cut into a 205 mm×20 mm (length×width) polarizer specimen. An adhesive film having a size of 210 mm×25 mm×0.5 cm (length×width×thickness) was attached to the polarizer specimen. Adhesive strength between the polarizer specimen and the adhesive film was measured in accordance with JIS 2107.

While certain exemplary embodiments of the present invention have been illustrated and described, it is understood that various modifications, changes, alterations, and equivalent embodiments can be made by those skilled in the art without departing from the spirit and scope of the present invention, as defined in the following claims.

What is claimed is:

1. An adhesive composition for polarizing plates, the adhesive composition comprising a (meth)acrylic copolymer, an isocyanate crosslinking agent, and a silane coupling agent,
wherein:
a molar ratio A of a number of moles of hydroxyl groups in the (meth)acrylic copolymer is about 2.5 mol % to about 4 mol % as calculated using Equation 1,
a molar ratio B of a number of moles of alkoxy silane groups in the silane coupling agent is about 50 mol % to about 80 mol % as calculated using Equation 2, and
a ratio C of a number of moles of isocyanate groups in the isocyanate crosslinking agent is about 20 mol % to about 50 mol % as calculated using Equation 3:

$$\text{molar ratio } A = (a2/a1) \times 100 \quad \text{Equation 1}$$

wherein a1 denotes a total number of moles of monomers included in a monomer mixture for forming the (meth)acrylic copolymer, and a2 denotes a number of moles of hydroxyl group-containing (meth)acrylic monomers in the monomer mixture;

$$\text{molar ratio } B = \{b/(b+c)\} \times 100 \quad \text{Equation 2}$$

$$\text{molar ratio } C = \{c/(b+c)\} \times 100 \quad \text{Equation 3}$$

wherein b denotes (a number of moles of the silane coupling agent in the adhesive composition)×(a number of moles of alkoxy silane groups contained in one molecule of the silane coupling agent), and c denotes (a number of moles of the isocyanate crosslinking agent in the adhesive composition)×(a number of moles of isocyanate groups contained in one molecule of the isocyanate crosslinking agent).

2. The adhesive composition according to claim 1, wherein the (meth)acrylic copolymer has an acid value of about 0.5 mg KOH/g or lower.

3. The adhesive composition according to claim 1, wherein the (meth)acrylic copolymer is a copolymer of a monomer mixture comprising: a hydroxyl group-containing (meth)acrylic monomer; and at least one of an alkyl group-containing (meth)acrylic monomer, a hetero ring-containing (meth)acrylic monomer, an aromatic group-containing (meth)acrylic monomer, or an alicyclic group-containing (meth)acrylic monomer.

4. The adhesive composition according to claim 3, wherein the (meth)acrylic copolymer is a copolymer of a monomer mixture comprising about 96.0 mol % to about 97.5 mol % of an unsubstituted $C_1$ to $C_{20}$ alkyl group-containing (meth)acrylic acid ester, and about 2.5 mol % to about 4.0 mol % of a $C_2$ to $C_{20}$ alkyl group-containing (meth)acrylic acid ester having a hydroxyl group.

5. The adhesive composition according to claim 3, wherein the (meth)acrylic copolymer is a copolymer of a monomer mixture comprising about 76.0 mol % to about 97.4 mol % of a $C_1$ to $C_{20}$ alkyl group-containing (meth)acrylic acid ester; about 2.5 mol % to about 4.0 mol % of a $C_2$ to $C_{20}$ alkyl group-containing (meth)acrylic acid ester having a hydroxyl group; and about 0.1 mol % to about 20.0 mol % of at least one of the hetero ring-containing (meth)acrylic monomer, the alicyclic group-containing (meth)acrylic monomer, or the aromatic group-containing (meth)acrylic monomer.

6. The adhesive composition according to claim 1, wherein the (meth)acrylic copolymer has a glass transition temperature of about −52° C. to about −27° C.

7. The adhesive composition according to claim 1, wherein the silane coupling agent comprises a mercapto group-containing silicon compound.

8. The adhesive composition according to claim 1, wherein the isocyanate crosslinking agent comprises an end capped isocyanate crosslinking agent.

9. The adhesive composition according to claim 1, comprising: about 0.1 parts by weight to about 10 parts by weight of the isocyanate crosslinking agent based on 100 parts by weight of the (meth)acrylic copolymer, and about 0.1 parts by weight to about 10 parts by weight of the silane coupling agent based on 100 parts by weight of the (meth) acrylic copolymer.

10. An adhesive film for polarizing plates formed from the adhesive composition for polarizing plates according to claim 1.

11. The adhesive film for polarizing plates according to claim 10, the adhesive film for polarizing plates having an adhesive strength to a polarizer of about 1,000 gf/inch or greater.

12. A polarizing plate comprising:
a polarizer,
an adhesive layer on one surface of the polarizer, the adhesive layer comprising the adhesive film for polarizing plates according to claim 10, and
a protective film on another surface of the polarizer.

13. An optical display comprising the polarizing plate according to claim 12.

* * * * *